United States Patent [19]

Lightner et al.

[11] 3,995,947

[45] Dec. 7, 1976

[54] ELECTRICAL CONNECTOR ASSEMBLY

[75] Inventors: Linn Stephen Lightner, Camp Hill; Edwin Oscar Classon, Carlisle, both of Pa.

[73] Assignee: AMP Incorporated, Harrisburg, Pa.

[22] Filed: Jan. 31, 1975

[21] Appl. No.: 545,963

[52] U.S. Cl. ........................ 339/92 M; 339/103 C; 339/126 RS; 339/127 R; 339/208

[51] Int. Cl.² .................... H01R 13/58; H02B 1/02

[58] Field of Search ........................... 339/126–128, 339/131, 92, 103, 107, 206, 208; 174/58, 65 R; 248/27

[56] References Cited

UNITED STATES PATENTS

| | | | |
|---|---|---|---|
| 2,686,828 | 8/1954 | Guy et al. | 174/65 R |
| 3,079,581 | 2/1963 | Klumpp, Jr. | 339/128 |
| 3,179,738 | 4/1965 | De Lyon | 339/126 RS |
| 3,193,226 | 7/1965 | Showalter | 248/27 |
| 3,353,143 | 11/1967 | Pauza | 339/128 |
| 3,622,943 | 11/1971 | Reimer | 339/103 M |
| 3,781,766 | 12/1973 | Teagno | 339/107 |

*Primary Examiner*—Roy Lake
*Assistant Examiner*—Neil Abrams
*Attorney, Agent, or Firm*—Russell J. Egan

[57] ABSTRACT

An improved rectangular electrical connector assembly is disclosed for detachable mounting in equipment panels of different thicknesses. The connector assembly includes cable strain relief means which is angularly positionable to accommodate a cable entering the connector housing from any one of several different directions. The connector assembly includes inexpensive pin and socket contacts and, preferably, a quick take-up type jackscrew to secure the plug and receptacle members together.

15 Claims, 15 Drawing Figures

FIG. 6
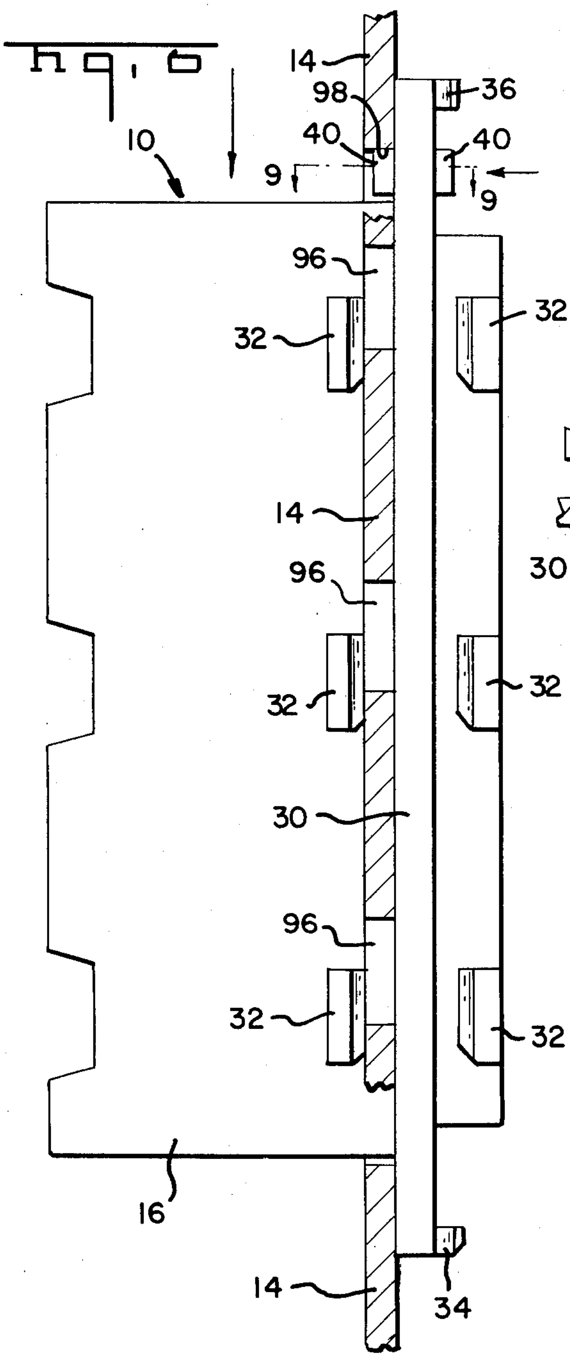
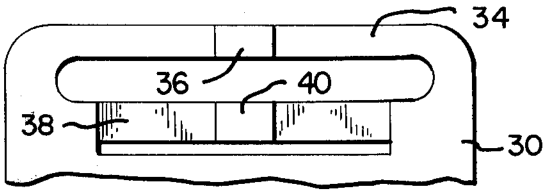
FIG. 10
FIG. 9
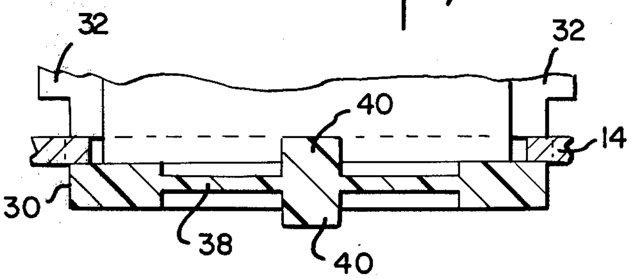
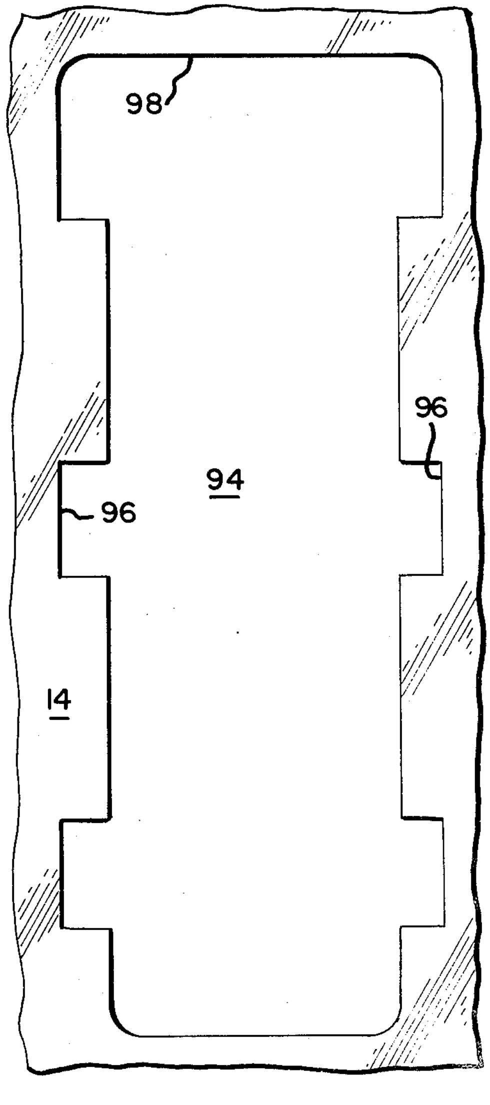
FIG. 8

Fig. 12
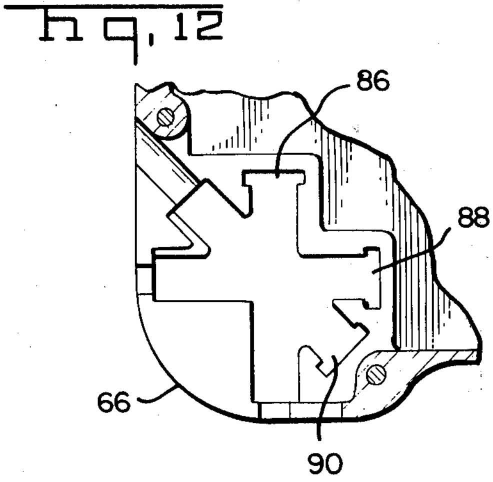
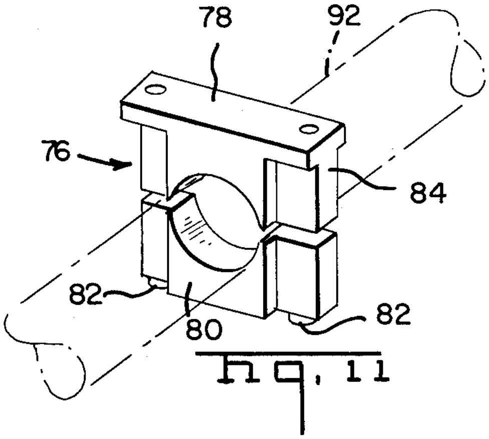
Fig. 11
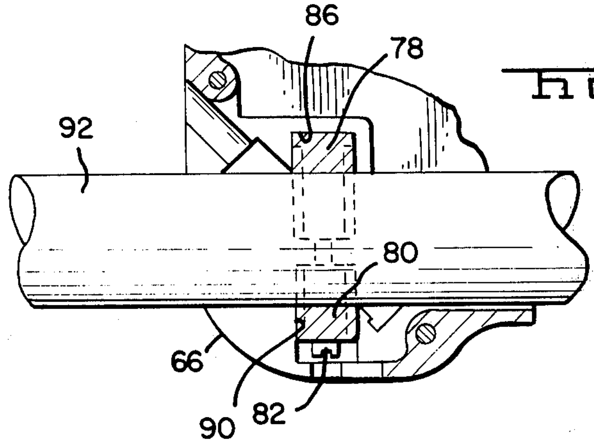
Fig. 13
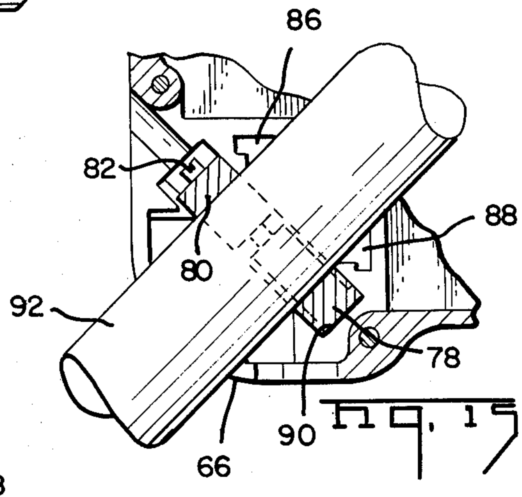
Fig. 15
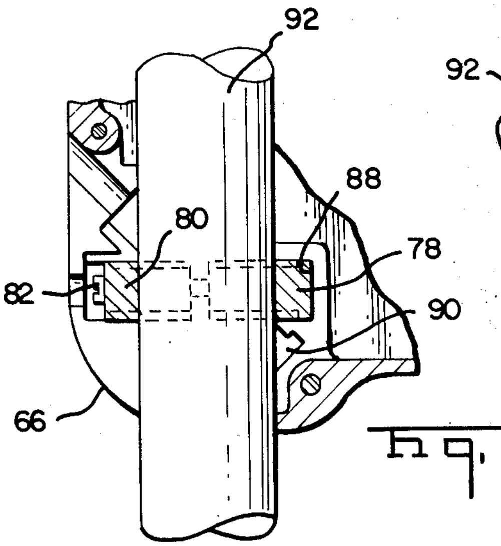
Fig. 14

ELECTRICAL CONNECTOR ASSEMBLY

BACKGROUND OF THE INVENTION

1. The Field of the Invention The present invention relates to an improved multi-position electrical connector assembly and in particular to an improved means for detachably mounting the connector assembly on panels of different thicknesses and with angularly adjustable cable strain relief means.

2. The Prior Art

Multi-position connectors are well known and come equipped with a variety of means for mounting the connectors on related panels and the like. A great number of these mounting schemes require the use of threaded members which are screwed into the panels or which are used to tighten down wing-like members which engage against the panels. Another type of mounting means includes integral flanges on the connector which are bent so as to secure the connector onto the related panel. While these various mounting schemes have generally been satisfactory, they have always included certain problems in mounting connectors. In particular there is a problem of speed of assembly which is likewise related to the feasibility of adapting the connector for machine mounting. They also may require the use of specialized tooling to effect the mounting. It is likewise well known to provide connectors with strain relief means for the cables. However, most of the known strain relief means are not angularly adjustable or angularly selectable but have a fixed angle of cable entry into the connector.

SUMMARY OF THE INVENTION

The subject connector assembly includes means for detachably mounting the connector assembly on a panel or the like and which means require the use of no tools for effecting the correct assembly. The connector assembly includes a plug member and a receptacle member, each with a body portion having an integral radial flange extending about the entire periphery thereof. A plurality of stepped mounting lugs are formed integral with and on two opposite sides of the body spaced from the flange. At each end of the flange there is a transverse biasing arm having a pair of oppositely directed lugs. At one end of the flange there is a transversely extending resilient latching member which also includes a pair of oppositely directed biasing lugs. The connector assembly further includes an angularly positionable strain relief means including clamp means adopted to be secured on a cable and a plurality of profiled grooves in the housing adapted to receive the clamp in a selected one of several angularly disposed positions.

It is therefore an object of the present invention to produce an improved electrical connector assembly which can be readily mounted on panels of different thicknesses without the use of either spacers or specialized tooling.

It is a further object of the present invention to produce an improved electrical connector assembly which can be detachably mounted from either the front or rear of a panel.

It is a further object of the present invention to produce an improved electrical connector assembly having angularly positionable cable strain relief means.

It is still another object of the present invention to produce an improved electrical connector assembly which can be readily and economically produced.

The means for accomplishing the foregoing and other objects of the present invention will become apparent to those skilled in the art from the following detailed description taken with reference to the accompanying drawings.

BRIEF DESCRIPTION OF THE DRAWINGS

FIG. 3 is a fragmentary plan view of a panel having profiled aperture adapted to receive the subject electrical connector assembly;

Figure 4:
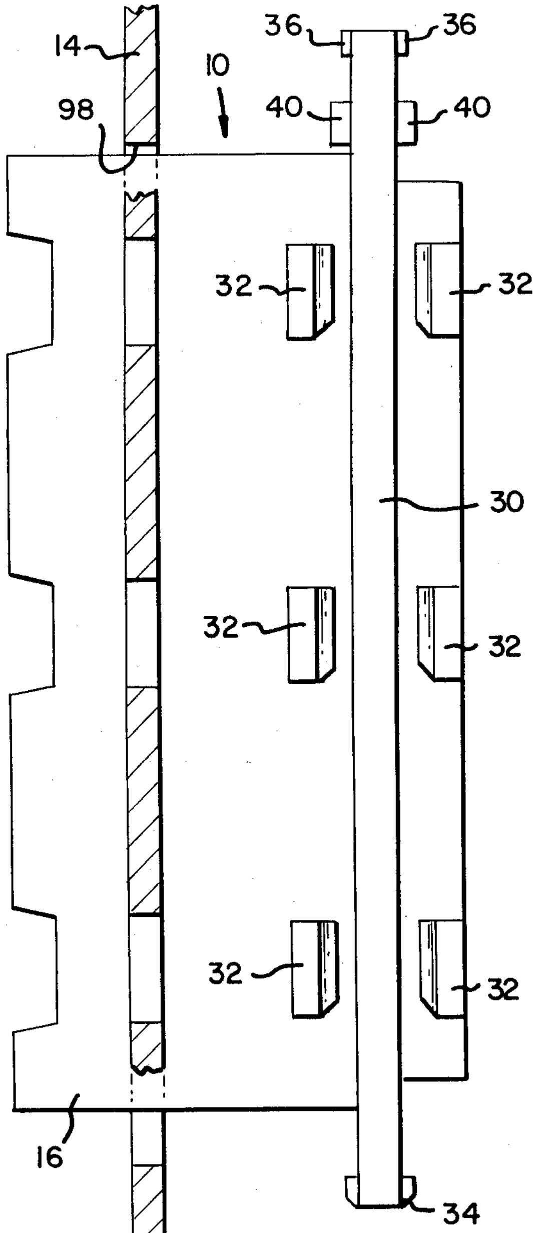
FIG. 4 is a side elevation, partially in section, showing the initial insertion of the subject connector assembly into the panel aperture of FIG. 3.
Figure 5:
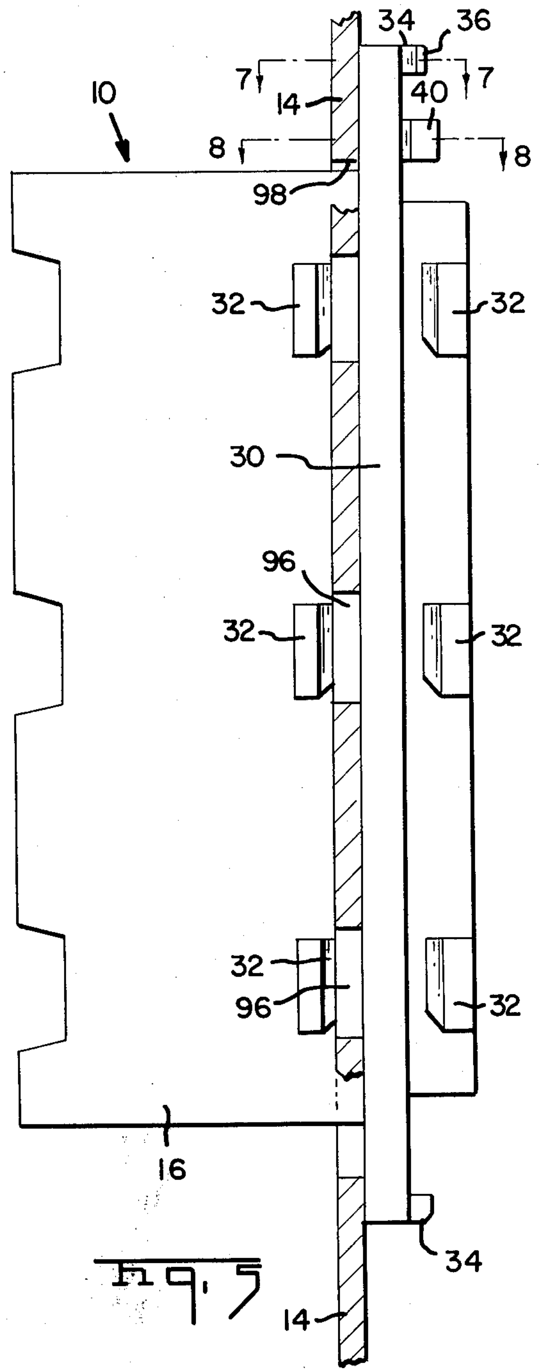
Figure 7:
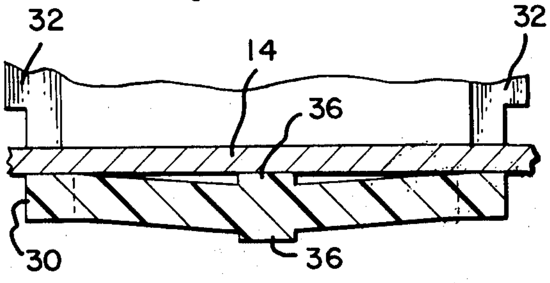
Figure 8:
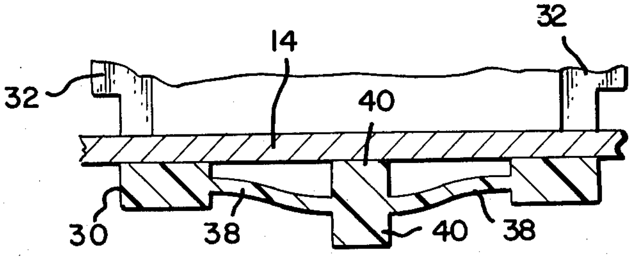

FG. 5 is a side elevation, similar to FIG. 4, showing the subject connector assembly fully inserted into the panel aperture;

FIG. 6 is a side elevation, similar to FIGS. 4 and 5 showing the subject connector assembly in the locked position after a longitudinal movement in the plane of the panel;

FIG. 7 is a transverse section taken along lines 7—7 of FIG. 5;

FIG. 8 is a transverse section taken along line 8—8 of FIG. 5;

FIG. 9 is a transverse section taken along line 9—9 of FIG. 6;

FIG. 10 is a partial plan of one end of the mounting flange;

FIG. 11 is a perspective view of the subject strain relief cable clamp;

FIG. 12 is a partial side elevation of one half of the connector assembly housing rear shell showing the plurality of profiled strain relief cable clamp receiving grooves; and FIG. 13, 14 and 15 are side elevations, similar to FIG. 12, showing the strain relief clamp positioned in the various cable clamp receiving slots.

DETAILED DESCRIPTION OF THE PREFERRED EMBODIMENT

The subject connector assembly includes a receptacle member 10 and a plug member 12. The receptacle member is shown mounted in a panel 14. However, both members have substantially identical mounting means so that either member can be detachably mounted in a panel or the like with the subject mounting means accommodating panels of different thicknesses.

The receptacle member 10 includes a main body portion 16 having a mating face 18 surrounded by a hood portion 20. Located in the mating face 18 surrounded by a hood portion 20. Located in the mating face is a locking aperture 22, which in this case is threaded. A plurality of contact pins 24 are mounted passing through the body portion 16 and extending from the mating face 18 but not beyond the hooded portion 20. A plurality of alignment and polarizing means 26, 28 are integral with the inside of the hooded portion 20. Extending radially outwardly from a portion of the body portion 16 is a mounting flange 30. On at least one side of the flange 30, and spaced therefrom, are a plurality of rigid stepped locking lugs 32 integral with body portion 16. At each end of the mounting flange 30 there is a transverse biasing bar member 34 each having a pair of substantially centrally located biasing projections 36 extending from the opposite sides thereof. At one end of the body portion and spaced parallel to one of the biasing bars 34, is a latching bar 38 having a pair of substantially centrally located lugs 40 extending from opposite sides thereof.

The plug member 12 includes a body member 42 having a plurality of recesses 44 adopted to mate with the alignment and polarizing means 26, 28 of the receptacle member 10. The plug member also has a plurality of contact receiving bores 46 extending therethrough to a mating face 48. A plurality of receptacle terminals (not shown) are mounted in the respective bores in alignment with the pin contacts 24 of the receptacle member 10. A locking means, such as jackscrew 50 is mounted passing through the body portion 42 and positioned to engage in the threaded bore 22 of the receptacle member. A radially directed mounting flange 52 extends integrally from the body portion 42 in the same manner as the flange 30 of the receptacle member 10. A plurality of rigid stepped locking lugs 54 are spaced from the flange 52 integral with the body portion 42. A transverse biasing bar 56, 58 is located at each end of the flange 52, each bar having a pair of substantially centrally located and oppositely directed lugs 60. A latching bar 62 extends across one end of the flange parallel to and spaced from biasing bar 56. The latching bar 62 has a pair of substantially centrally located, oppositely directed integral lugs 64. A pair of housing shell members 66, 68 are arranged to enclose the rear of the plug body portion 42 and are substantial mirror images of one another. The housing shell members 66, 68 are secured together by conventional means such as bolts 70. Each housing includes an inwardly directed flange or channel 72 adapted to engage some of the locking lugs 54. One housing shell member 68 includes an integral abutment 74 which limits the rotary movement of the jackscrew 50.

A cable strain relief means is incorporated in the subject connector assembly and includes a cable lamp 76 including first and second mating members 78, 80 which are secured together by means of bolts 82. One mating clamp member 78 includes T-shaped end profile 84 which is adapted to be received in one of the profiled recesses 86, 88, 90 in the housing shell members. These recesses 86, 88, 90 are angularly positioned with respect to each other so that the cable clamp 76, and the cable 92 secured thereby, can be fixed to the housing with at least three different angular orientations.

Figure 2:
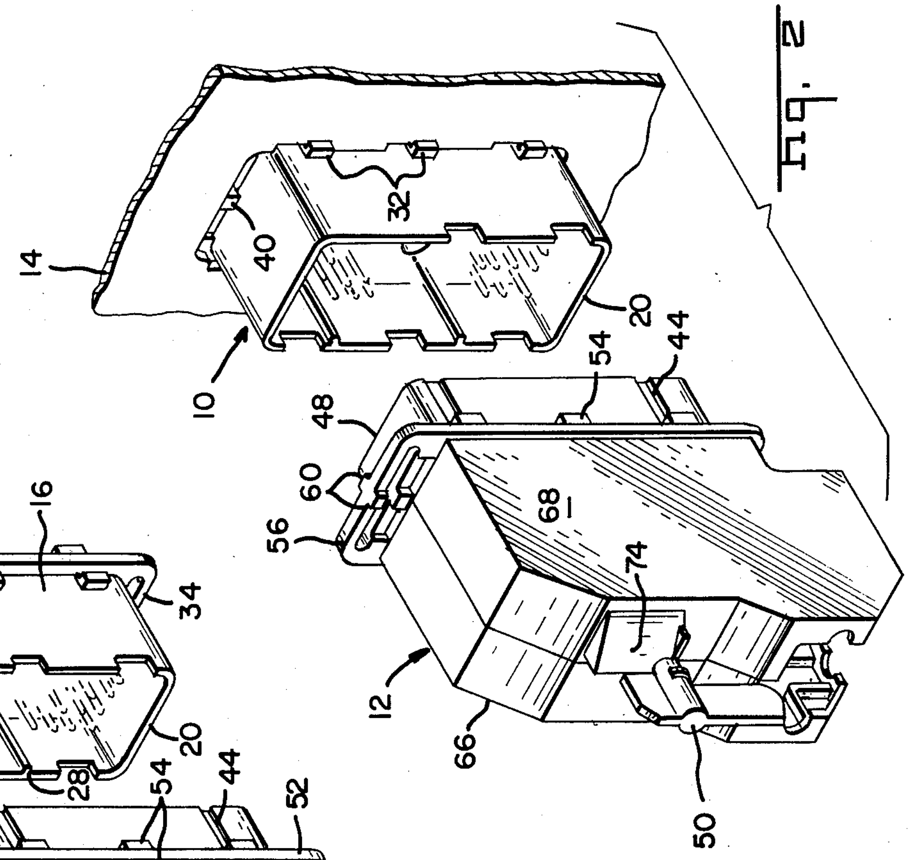
FIG. 2 is a partially exploded perspective view of the subject electrical connector assembly, the receptacle portion of which is mounted in a panel.
Figure 1:
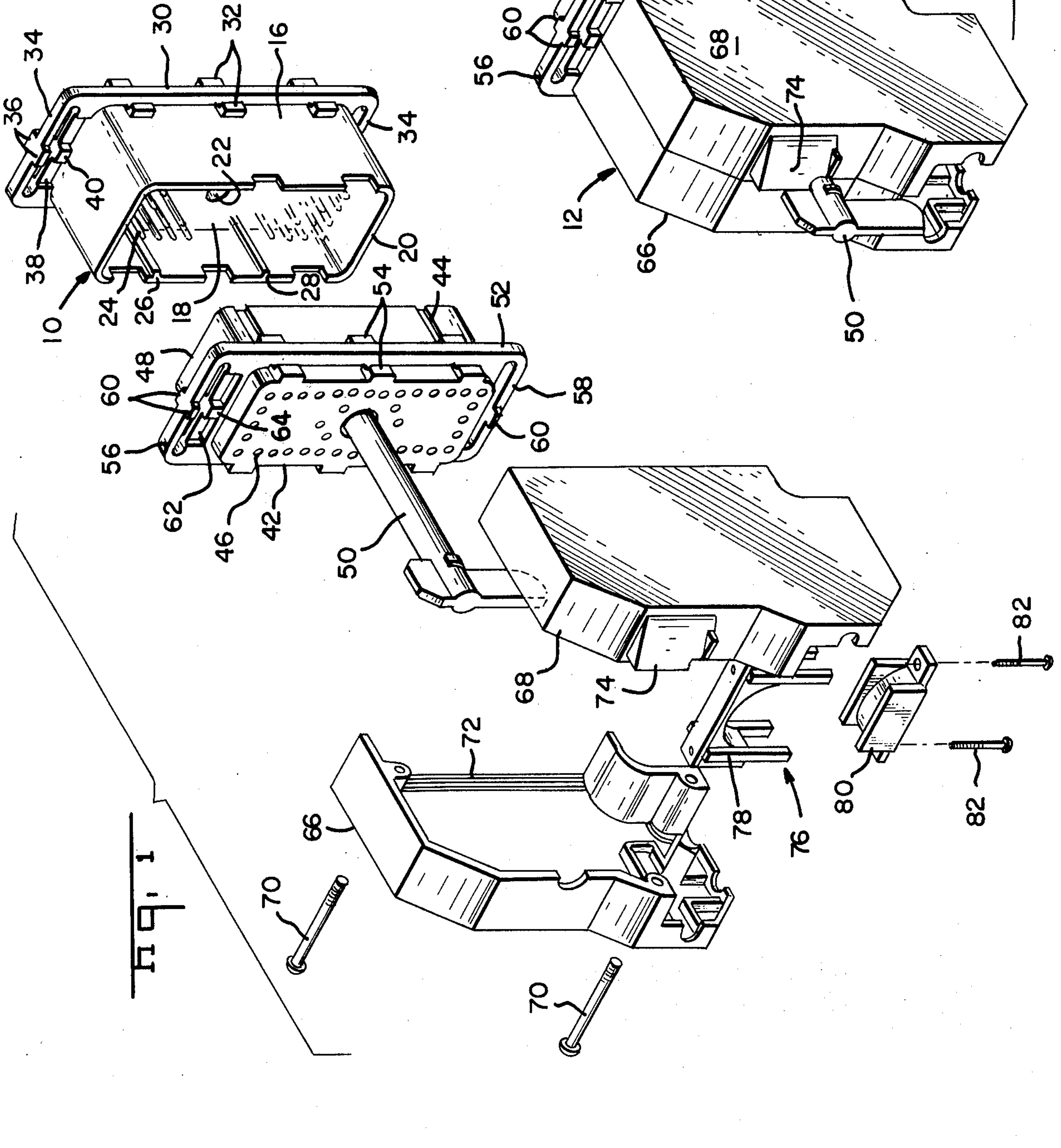
FIG. 1 is an exploded perspective view of the subject electrical connector assembly.

The steps of mounting the subject connector assembly in a profiled aperture in a panel will be described with reference to FIGS. 3 to 10. These Figures relate to the mounting of a receptacle member 10 in a panel, as shown in FIG. 2, but likewise could be applied to the plug member 12 as mentioned previously.

The profile aperture 94 in panel 14 is an elongated, generally rectangular opening with a plurality of recesses or notches 96 spaced along two opposite sides thereof with a spacing and alignment generally equal to the locking lugs 32 of the receptacle member 10 to be received therein. The overall profile of the aperture 94 corresponds generally with that of the member to be received therein with the exception that it is slightly longer in length. The receptacle member 10 is initially inserted into the aperture, as shown in FIG. 4, with the locking lugs 32 in general alignment with the recesses 96. The locking lugs 32 pass through the recesses 96, as shown in FIG. 5, and the member is pressed firmly against the panel until the locking lugs 32 clear the rear surface of the panel 14. In this position both the biasing bars 34 and the latching bar 38 will be deformed by engagement of their respective lugs 36, 40 against the front surface of the panel. The biasing bars and latching bar will assume the configurations shown in FIGS. 7 and 8, respectively. The member is then moved longitudinally in the plane of the panel until the latching bar 38 clears the upper edge 98 of aperture 94 and will resume its normal position with the lug 40 extending into the aperture 94, as shown in FIG. 9, to lock the connector member in place. In this position the locking lugs 32 lie behind the panel adjacent to, but not in alignment with, the recesses 96 in the panel.

It will be noted from the FIGS. 4 to 9 that the stepped configuration of the locking lugs 32 allows the member to be mounted on panels of different thicknesses. It should also be noted that by having locking lugs 32 on both sides of the mounting flange 30, the member can be detachably mounted from either the front or the rear of a panel. Further, while only a single step has been shown in each of the locking lugs, it is to be understood that more than one step can be provided or, alternatively, the steps in the locking lugs on the opposite sides of the mounting flange can be of different heights to accommodate a number of different panel thicknesses.

As another alternative, the biasing bars and/or the latching bar can be formed by pairs of cantilever beams and the bars can be located on the sides of the members rather than on the ends as shown. Also, smaller versions of the subject connector assembly will not need a jackscrew to secure the members together. Instead they can use a snap-in, overside type fastener which has high retention in one direction and low retention in the opposite direction. This fastener can be snapped into one member and detachably secure the other member thereto.

The assembly of the cable strain relief means will be described with reference to FIGS. 11 to 15. The cable clamp 76 is shown in FIG. 11 with a cable 92 being shown in phantom. The clamp is assembled onto a cable and secured by the bolts 82 in a well known manner. FIG. 12 shows a side elevation of housing shell 66 with the recesses 86, 88 and 90 being clearly illustrated. Recesses 86 and 88 extend substantially normal to one another and the third recess 90 intersects and bisects the angle defined by the first two recesses. It will also be noted that each recess has an overall T-shaped configuration. The cable is mounted or positioned in the housing with the shaped clamp flange 84 resting in one of the recesses as shown in FIGS. 13 to 15. The housing shells 66, 68 are then assembled together by means of bolts 70.

The above-described embodiment of the present electrical connector assembly may be subject to many modifications and changes without departing from the spirit or essential characteristics thereof. Therefore the described embodiments are to be considered in all respects as illustrative and not restrictive.

What is claimed is:

1. An improved electrical connector assembly having both a receptacle member and a plug member, at least one of which has means for detachably mounting in a profiled aperture in a panel or the like, said plug member and said receptacle member each including a body portion with a plurality of bores extending therethrough to a mating face, a plurality of matable electrical contact terminals mounted in respective pairs of said bores and carried by said members into intermating engagement, said means for detachably mounting comprising:

a radially directed flange extending integrally from said body portion of said one of said members;

first and second biasing bars spanning portions of said flange on opposite sides of said body, each said biasing bar having a substantially centrally located lug extending from both sides thereof in a direction normal to the plane of said flange;

a latching bar spanning a portion of said flange and having integral lugs substantially centrally located thereon and extending from both sides thereof in directions normal to the plane of said flange, said latching bar parallel to one of said biasing bars and spaced inwardly thereof towards said body portion;

a plurality of locking lugs integral with said body and spaced from said flange, whereby said member is mounted on said panel by insertion of said body into said profiled aperture until said flange abuts said panel and said locking lugs lie behind said panel, said biasing bars being deformed by engagement of their respective lugs with said panel, said member then being moved in the plane of said panel until said latching bar lug projects into said aperture and said locking lugs are displaced with respect to said profiled aperture thus securing the member in place.

2. An electrical connector assembly according to claim 1 wherein said locking lugs are integral with said body on both sides of said flange.

3. An electrical connector assembly according to claim 1 wherein each said locking lug has a stepped configuration facing said flange whereby mounting in panels of different thicknesses is accomplished.

4. An electrical connector assembly according to claim 1 wherein said flange is integral with said receptacle member.

5. An electrical connector assembly according to claim 1 wherein said flange is integral with said plug member.

6. An electrical connector assembly according to claim 1 further comprising cable strain relief means on at least one of said members comprising:

a pair of mating housing shells having therein a plurality of profiled recesses angularly positioned with respect to one another, inwardly directed means adapted to extend between the flange and at least some of said locking lugs of said one member, and means to secure said housing shells together with said inwardly directed means gripping said locking lugs, cable clamp means adapted to be secured to an electrical cable said cable clamp means having an outer profile substantially the same as that of a pair of said profiled recesses in said housing shells whereby said cable clamp means is received in any selected pair of said profiled recesses for the desired angular orientation of said cable.

7. An electrical connector assembly according to claim 6 wherein said cable clamp means comprises two clamping members, at least one of which has an outer profile matable with the profile of said housing shell recesses, and means to secure said clamping members together.

8. An improved electrical connector assembly comprising:

a receptacle member having a body portion with a plurality of through bores leading to a mating face, a hood extending from said body portion surrounding said mating face, a plurality of pin terminals fixedly mounted in said bores and extending from said face;

a plug member having a body portion with a plurality of through bores leading to a mating face, said plug member body portion having an outer profile allowing insertion into said hood of said receptacle members, a plurality of receptacle contacts fixedly mounted in said bores of said plug member and matable with the pin contacts of said socket member, and means for detachably securing said plug member and said receptacle member together in an engaged condition;

means for mounting at least one of said members in a profiled aperture of a panel or the like, said mounting means comprising a radially directed flange integral with the body portion of said one member, first and second biasing bars spanning portions of said flange on opposite sides of said body, each said biasing bar having an integral lug extending in opposite directions therefrom normal to the plane of said flange, a latching bar spanning a portion of said flange parallel adjacent to and inwardly of one of said biasing bars, said latching bar having an integral lug extending in opposite directions therefrom normal to the plane of said flange, and a plurality of locking lugs spaced parallel to said flange along two opposite sides of and integral with said body portion, whereby mounting is accomplished by inserting that portion of said body portion bearing said locking lugs into a profile aperture until said flange engages said panel and said biasing bars and latching bar are deformed by engagement of their respective lugs with said panel, moving said member in the plane of said panel until said latching bar lug projects into the aperture and said locking lugs are displaced with respect to said aperture to thereby secure said member in position.

9. An electrical connector assembly according to claim 8 further comprising cable strain relief means for either of said receptacle and said plug members comprising:

a pair of substantially mirror image housing shell members each having a plurality of angularly offset profiled recesses, inwardly directed means adapted to extend between the flange and at least some of said locking lugs of said member, and means to secure said shell members together with said inwardly directed means gripping said locking lugs;

cable clamping means comprising a pair of clamping members at least one of which has an outer profile substantially the same as said profiled recesses, and means to secure said clamping members together, whereby said profiled cable clamping means is received in a selected pair of said profiled recesses with said cable extending from said housing with the desired angular orientation.

10. An electrical connector assembly according to claim 8 wherein:

said means for detachably securing said plug member and said receptacle member together in an engaged condition comprises a jackscrew rotatably mounted in one of said members and a threaded recess in the other of said members.

11. An electrical connector assembly according to claim 8 wherein said locking lugs are integral with said body on both sides of said flange.

12. An electrical connector assembly according to claim 8 wherein each said locking lug has a stepped configuration facing said flange whereby mounting in panels of different thicknesses is accomplished.

13. An electrical connector assembly according to claim 8 wherein said flange is integral with said receptacle member.

14. An electrical connector assembly according to claim 8 wherein said flange is integral with said plug member.

15. An improved electrical connector assembly comprising:

a receptacle member having a body portion with a plurality of through bores leading to a mating face, a hood extending from said body portion surrounding said mating face, a plurality of pin terminals fixedly mounted in said bores and extending from said face;

a plug member having a body portion with a plurality of through bores leading to a mating face, said plug member body portion having an outer profile allowing insertion into said hood of said receptacle members, a plurality of receptacle contacts fixedly mounted in said bores of said plug member and matable with the pin contacts of said socket member, and means for detachably securing said plug member and said receptacle member together in an engaged condition;

a radially directed flange extending integrally from said body portion of at least one of said members, a plurality of locking lugs integral with and extending outwardly from at said least one of said member spaced from said flange, strain relief means for attaching a cable to said one of said members with selected angular orientation, said strain relief means including:

a pair of substantially mirror image housing shell members each having a plurality of angularly offset profiled recesses, inwardly directed means adapted to extend between said flange and at least some of said locking lugs of said member, and means to secure said shell members together with said inwardly directed means gripping said locking lugs;

cable clamping means comprising a pair of clamping members at least one of which has an outer profile substantially the same as said profiled recesses, and means to secure said clamping members together, whereby said profiled cable clamping means is received in a selected pair of said profiled recesses with said cable extending from said housing with the desired angular orientation.

* * * * *